United States Patent [19]

Hirai et al.

[11] Patent Number: 4,578,048
[45] Date of Patent: Mar. 25, 1986

[54] SLIDABLE TYPE CONSTANT VELOCITY UNIVERSAL JOINT

[75] Inventors: Seiichi Hirai, Saitama; Akira Nishizawa, Asaka; Nobuyuki Otsuka, Kawagoe, all of Japan

[73] Assignee: Honda Giken Kogyo Kabushiki Kaisha, Tokyo, Japan

[21] Appl. No.: 236,914

[22] Filed: Jul. 6, 1981

[30] Foreign Application Priority Data

Feb. 25, 1980 [JP] Japan ............................... 55-22377[U]

[51] Int. Cl.[4] ............................................... F16D 3/20
[52] U.S. Cl. .................................... 464/111; 464/124; 464/905
[58] Field of Search ............... 464/111, 123, 124, 132, 464/905

[56] References Cited

U.S. PATENT DOCUMENTS

| 1,863,244 | 6/1932 | Goddard | 464/124 |
| 3,818,721 | 6/1974 | Wahlmark | 464/111 |
| 4,192,154 | 3/1980 | Nakamura et al. | 464/111 |
| 4,379,706 | 4/1983 | Otsuka et al. | 464/111 |

FOREIGN PATENT DOCUMENTS

| 36614 | 3/1980 | Japan | 464/111 |
| 54721 | 4/1980 | Japan | 464/111 |

Primary Examiner—Stuart S. Levy
Assistant Examiner—Daniel P. Stodola
Attorney, Agent, or Firm—Roberts, Spiecens & Cohen

[57] ABSTRACT

A constant velocity universal joint of the type having rollers carried by radial trunnions of an inner rotary member and which are received in axial grooves in an outer rotary member, including abutment members which engage abutment surfaces of the grooves and which prevent locking engagement of the rollers with both of the opposed walls of the axial grooves.

25 Claims, 8 Drawing Figures

SLIDABLE TYPE CONSTANT VELOCITY UNIVERSAL JOINT

FIELD OF THE INVENTION

This invention relates to a constant velocity universal joint of the type including an outer rotatable member having axially extending grooves internally thereof, and an inner rotatable member having radially extending trunnions which support rollers for axial sliding movement relative to the trunnions and for universal pivoting movement relative thereto. The rollers are received within the said axially extending grooves of the outer member and roll axially thereof during orbital movement of the rollers upon rotation of the inner and outer members with the axis of the respective members inclined relative to each other.

While not limited thereto, the invention of the present application finds particular application in a "tripod" type of constant velocity universal joint employed in the drive to front wheels of a motor vehicle.

PRIOR ART

Typical examples of such "tripod" type constant velocity universal joints are disclosed in Nakamura et al, U.S. Pat. No. 4,192,154, issued Mar. 11, 1980, and in Otsuka et al, U.S. Pat. No. 4,379,706, issued Apr. 12, 1983.

BACKGROUND OF THE INVENTION

When employed in a front wheel drive for a motor vehicle, the axis of the respective inner and outer rotatable members of the universal joint are oriented in inclined relationship relative to each other, both in dependence on the position and vertical movement of the vehicle wheels relative to the vehicle body and in dependence on the steering movement of the vehicle wheels relative to the longitudinal axis of the vehicle body. Conventionally, the outer rotatable member of the universal joint is affixed to the wheel hub with its axis of rotation lying in a substantially horizontal plane, and the axis of the inner rotatable member is inclined relative to that plane.

Due to the inclination of the axis of the inner rotable member relative to the axis of the outer rotatable member, the rollers carried by the trunnions of the inner rotatable member are caused to move in an orbital path upon rotation of the respective members, this requiring that the respective rollers move axially of the longitudinal grooves in the outer rotatable member to opposite sides of a median plane perpendicular to the axis of the outer rotatable member. Additionally, upon such movement of the rollers in one axial direction longitudinally of the grooves, the rollers must progressively slide axially of the trunnions in one direction, and, upon movement of the rollers axially of the grooves in the opposite direction, the rollers must progressively slide axially of the trunnions in a direction opposite to the first direction, the axial sliding movement of the rollers relative to the trunnion occuring in addition to pivotal movement of the rollers relative to the axis of the respective trunnions, such as occurs as a result of the rollers moving along linear paths which are inclined relative to the plane of movement of the axis of the respective trunnions.

At the time the rollers are moving axially outwardly along the trunnions, the frictional restraint on such movement results in a force being exerted on the rollers in a direction radially inwardly of the axis of the outer rotatable member, and conversely, upon movement of the rollers axially inwardly along the trunnion, the frictional restraint imposed on such movement results in a force being exerted on the rollers in a direction radially outwardly of the axis of the outer rotatable member.

Of necessity, and in order to eliminate simultaneous contact of the rollers with both of the opposed axial side walls of the longitudinal grooves in the outer rotatable member, the rollers intentionally are slightly undersized relative to the width of the longitudinal grooves, such that, under normal operating conditions, simultaneous contact of the roller with both side walls of the grooves cannot occur.

Such simultaneous contact must be avoided, in that axial movement of the respective rollers in one direction of rotation of the universal joint results in a rolling movement of the roller relative to one side wall of the groove, and a rotary movement of the roller relative to the opposite side wall of the groove in a direction which is opposite to that required for rolling motion of the roller relative to said opposite side wall.

For practical reasons, the opposite side walls of the longitudinal grooves are oppositely arcuately concave and, the outer periphery of the rollers are correspondingly convex, such that the rollers engage the associated side wall substantially in line engagement therewith.

While such an orientation of structure operates entirely successfully in the absence of forces exerted on the rollers in a direction radially inwardly or radially outwardly of the axis of the outer rotatable member, such as occurs only when the axes of the inner and outer rotatable members are aligned, in the presence of such radially inward or radially outward forces, there is a tendency for the rollers to climb up the associated side wall with a consequence that the diametrically opposite side of the roller will come into engagement with the opposite side wall.

The ability of the rollers to climb the associated side wall of the groove arises because the rollers are of a diameter slightly less than the width of the associated longitudinal groove and because there is a lack of restraint of movement of the rollers radially of the axis of the outer rotatable member.

Such a condition is entirely disadvantageous, in that simultaneous contact of the rollers with both of the groove side walls results in the roller being restrained against free rotation, accompanied by a consequential increase in the internal friction within the universal joint, the production of heat and noise within the universal joint, and abrasion or scuffing of the groove side walls and of the periphery of the rollers.

OBJECT OF THE INVENTION

It is the object of this invention to provide a constant velocity universal joint whose construction eliminates the possibility of the rollers coming into simultaneous engagement with the opposed groove side walls at those times when the rollers are subjected to a force acting radially inwardly of the axis of the outer rotable member.

INVENTIVE CONCEPT

According to the present invention, each roller is provided with an abutment member at the side thereof closest to the axis of the outer rotatable member, and the radially innermost portion of each groove side wall is provided with an abutment surface which is contacted by the abutment member prior to the roller reaching a position in which simultaneous engagement with both side walls of the groove would occur, engagement of the abutment member with the respective abutment surfaces acting firstly to prevent continued inward movement of the roller in a direction radially inwardly of the axis of the outer rotatable member, and secondly acting to overcome the frictional restraint imposed on the roller against free and unrestricted movement of the roller axially outwardly of its associated trunnion.

DESCRIPTION OF THE DRAWINGS

The invention will now be described with reference to the accompanying drawings, in which FIGS. 1 through 4 illustrate a known embodiment of "tripod" type constant velocity universal joint of the type disclosed in Otsuka et al U.S. Pat. No. 4,379,706, and in which

FIG. 1 is a longitudinal partial cross-section through a constant velocity "tripod" type universal joint of known type;

FIG. 2 is a cross-section taken on line II—II in FIG. 1;

FIG. 3 shows the universal joint in FIG. 1 in which an inner rotatable member thereof is inclined relative to an outer rotatable member thereof;

FIG. 4 is an enlarged fragmentary cross-sectional view illustrating a roller of the universal joint of FIGS. 1 through 3 when in simultaneous contact with the opposed side walls of longitudinal grooves formed in the outer rotatable member;

FIG. 5 is an illustration of a constant velocity "tripod" type universal joint incorporating a preferred embodiment of the present invention;

FIG. 6 is a fragmentary cross-sectional view taken on line VI—VI in FIG. 5;

FIG. 7 is a fragmentary cross-sectional view of an alternative preferred embodiment of the present invention; and FIG. 8 is a fragmentary cross-sectional view of another preferred embodiment of the present invention.

DESCRIPTION OF THE PRIOR DISCLOSED EMBODIMENT

Referring now to FIGS. 1 to 4 of the drawings, there is illustrated a universal joint having an outer rotatable member a which includes grooves b extending longitudinally of the inner surface thereof, the respective side walls of the grooves being arcuately concave about a common longitudinal axes to be of complementary part-cylindrical form.

Figure 3:
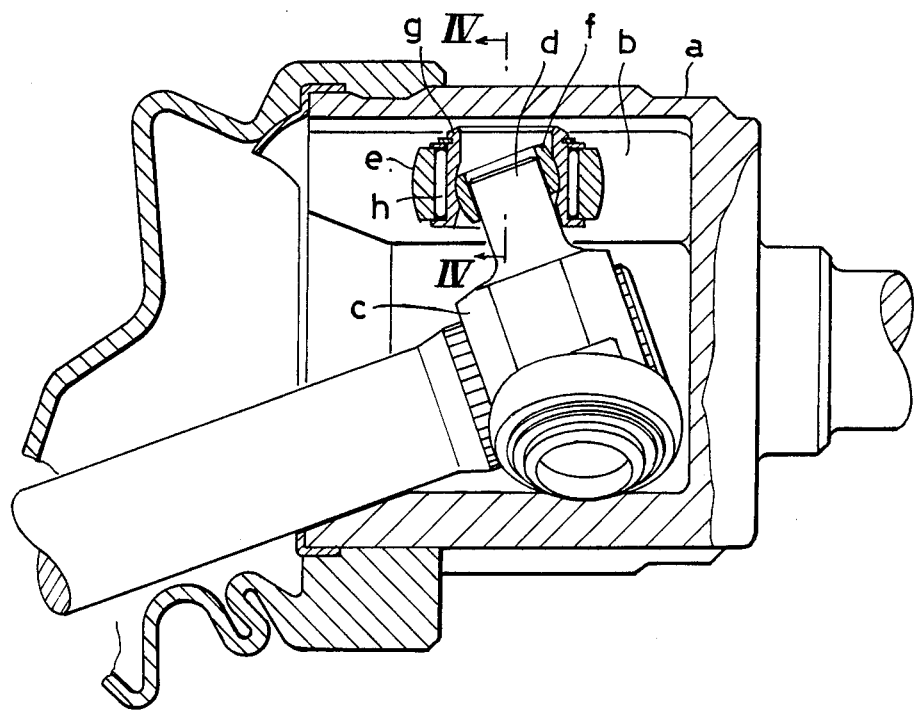

An inner rotatable member c extends into the outer rotatable member a and is freely movable within the outer rotatable member such that the longitudinal axes of the respective inner and outer members can be inclined relative to each other, as is illustrated in FIG. 3. The inner rotatable member c terminates in radially extending trunnions d which extend into the respective longitudinal grooves b, the respective trunnions each carrying a roller assembly comprised by a roller e which is mounted for rotation on the trunnion by inner and outer guide members f and g and a needle bearing h which is interposed between the roller e and the outer guide member g. The inner guide member f is slidable axially of the trunnion d, the outer surface on the inner guide member f being spherical and received within a spherical seating within the outer guide member g, such that the roller e is supported for universal pivoting movement relative to the trunnion d.

Figure 1:
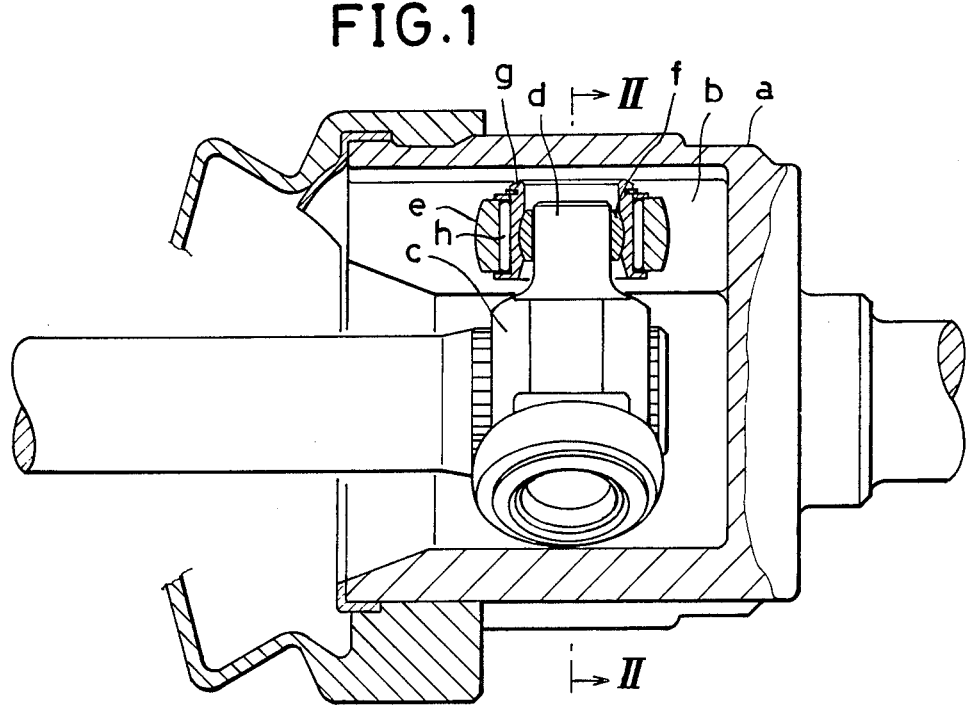
Figure 2:
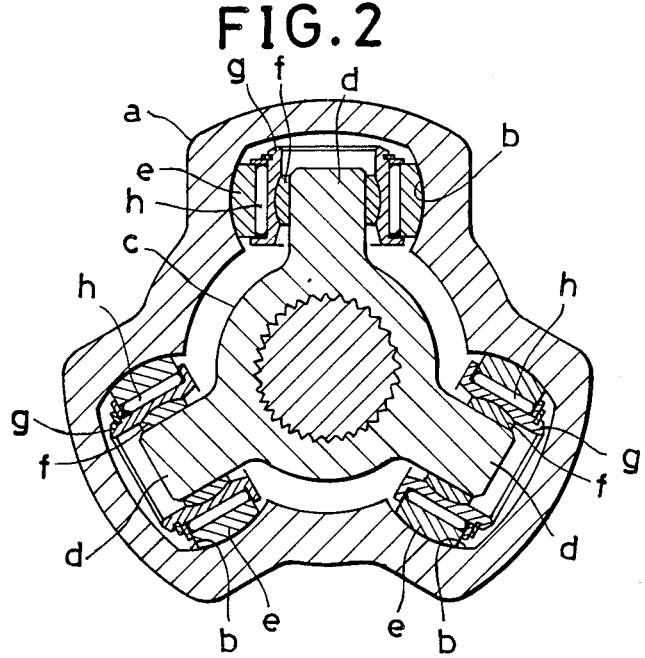

With the axes of the respective inner and outer members aligned as illustrated in FIGS. 1 and 2, torque applied to the inner rotatable member will produce a rotary movement of the outer rotatable member without any rolling motion of the respective rollers e longitudinally of the groove walls b, and, without any movement of the respective roller assemblies axially on their supporting trunnions.

When the axes of the respective inner and outer rotatable members are inclined relatively to each other, as is illustrated in FIG. 3, the rollers will travel on an orbital path to opposite sides of a median plane which is perpendicular to the longitudinal axis of the outer rotatable member. When moving away from said median plane, the rollers, which are constrained to move axially of the longitudinal grooves in the outer rotatable member, must pivot relative to their associated trunnion, and additionally, must move axially outwardly of the associated trunnion. Conversely, when moving towards said median plane, the rollers must pivot relatively to their associated trunnion in an opposite direction, and, must move axially inwardly of the associated trunnion.

Owing to the frictional restraint imposed on such movement of the rollers relative to the associated trunnions, and which arises at the interface of the trunnion d and the inner guide member f, and also at the interface of the inner guide member f and the outer guide member g, a force acting radially inwardly of the axes of the outer rotatable member is exerted on the rollers as they move away from said median plane, and, a force acting radially outwardly of the axes of the rotatable member is exerted on the rollers as they move towards said median plane.

In the event that the rollers were constrained against radial movement relative to the axes of the outer rotatable member, the aforementioned radially inward and radially outward forces exerted on the rollers would be of little consequence, in that those forces would be absorbed and dissipated at the interface of the rollers and the side walls of the respective longitudinal grooves. However, the geometry of the universal joint demands that the roller be "undersized" relative to the width of the associated groove, such that it shall not simultaneously engage both of the respective side walls of the grooves. It is here noted that at the time the universal joint is rotating in one direction, the rollers are engaged with and rolling along one of the side walls of the grooves, and, at their opposite side are rotating oppositely to the direction of movement of the rollers along the respective grooves. It is for this reason that the rollers must be "undersized" in order to ensure that they do not simultaneously engage both of the opposite side walls of the grooves.

As a consequence of the rollers being "undersized" relative to the width of the associated grooves, the rollers are not positive restrained against radial movement relatively to the axes of the outer rotatable member, but in fact are capable of such radial movement within a range determined by the extent to which the roller is "undersized" relative to the width of the groove. In operation of the universal joint, the rollers move radially of the axis of the outer rotatable member under the influence of the radially inward and radially outward forces exerted thereon, with a consequential probability of the rollers simultaneously engaging both of the opposite side walls of the grooves.

Figure 4:
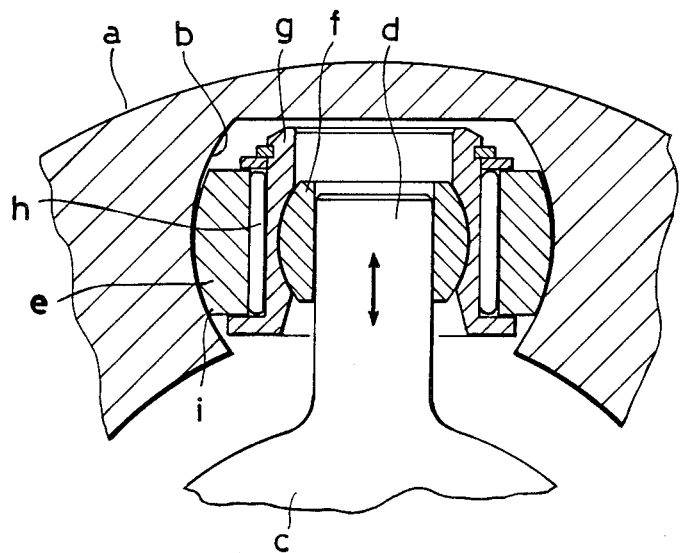

FIG. 4 illustrates the consequence of radially inward movement of the rollers under the influence of a radially inward force exerted thereon. In FIG. 4, the roller is shown as having climbed the side wall of the groove to a position in which the lower edge; of the roller is in simultaneous contact with both side walls of the groove. Such a condition is entirely disadvantageous, in that rotary movement of the roller is then restrained or possibly prohibited, and the roller must slide on the respective side walls of the groove, this resulting in an increase in internal friction within the universal joint, the production of heat and noise, and, the abrasion or scuffing of the groove side walls and of the roller periphery. An identical condition can arise in the event that a radially outward force is exerted on the rollers relatively to the axes of the outer rotatable member, under which condition the rollers move or climb upwardly in FIG. 4 to a position in which the upper edge of the roller is in simultaneous contact with both of the opposed side walls of the groove.

DESCRIPTION OF THE INVENTION

Figure 5:
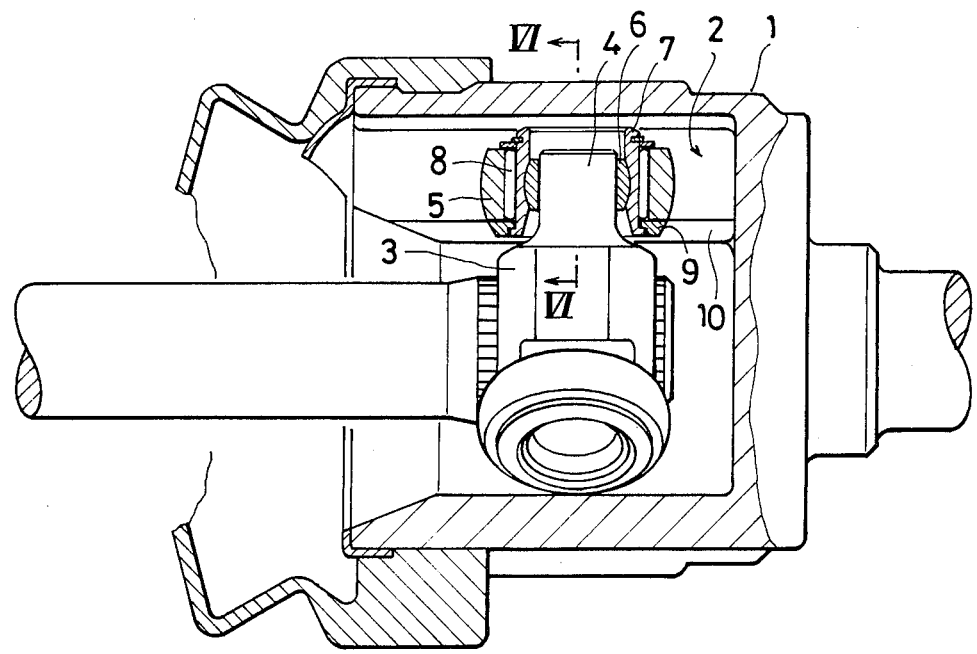
FIGS. 5 through 8 illustrate preferred embodiments which are provided with the improvements according to the present invention, the respective figures of the drawings being as follows.
Figure 6:
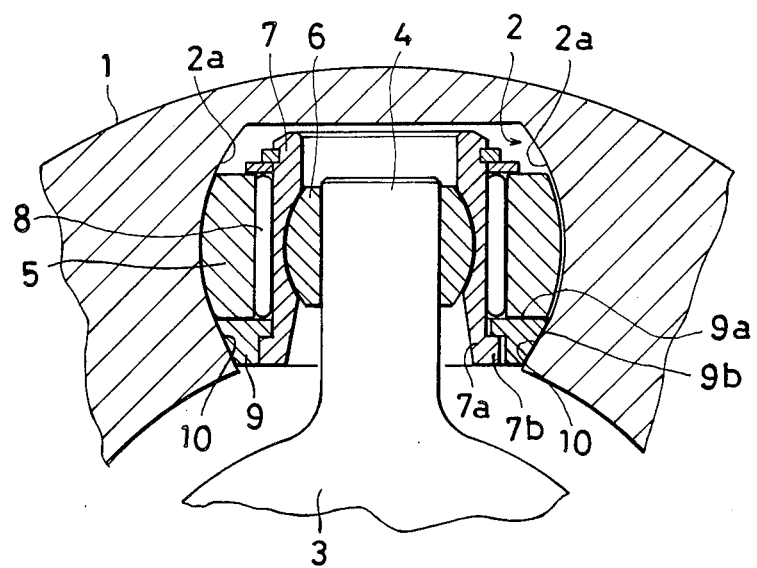

Referring now to FIGS. 5 and 6, which show one embodiment of the present invention, there is illustrated a constant velocity universal joint having an outer rotatable member 1 incorporating internal axially extending grooves 2. An inner rotatable member 3 incorporates radially extending trunnions 4 which respectively support rollers 5 for universal pivoting movement and for axial sliding movement relative thereto by means of inner and outer guide members 6 and 7.

As previously described, the inner guide member 6 is slidable axially on the trunnion 4 and has a spherical outer surface which is received within a spherical seating in the outer guide member 7, the roller 5 being supported on the outer guide member 7 by a needle bearing 8 for free rotational movement relatively to the outer guide member 7.

Also carried by the outer guide member 7 and rotatable relative thereto is an abutment member 9 supported on an axial extension 7a of the outer guide member 7 and restrained against movement axially of the outer guide member 7 by an annular flange 7b of the outer guide member 7 and by engagement of surface 9a thereof with the adjacent face of the roller 5. Conveniently, the abutment member 9 also serves as an end abutment for the rollers of needle bearing 8.

The inner periphery of the abutment member 9 is formed of a diameter slightly larger than the outer diameter of the outer guide member 7 and its flange 7b, such that the abutment member 9 is free to float relative to the outer guide member 7 in a direction perpendicular to the longitudinal axis thereof. The outer priphery of the abutment member 9 is conical in form and is of an included angle complementary to the included angle between abutment surfaces 10, 10 formed at the radially innermost edges of the side walls 2a, 2a. The diameter of the outer periphery of the abutment member 9 is chosen such that, when a force is applied to the roller 5 in a direction acting radially inwardly of the axis of the outer rotatable member 1, the abutment member 9 will engage the abutment surfaces 10, 10 prior to the roller 5 reaching a position in which it is in simultaneous contact with both side walls 2a, 2a of the groove, and such that the abutment member will prohibit further movement of the roller 5 in a direction radially inwardly of the axis of the outer rotatable member 1. Thus, the abutment member 9 prevents the roller 5 from reaching a position in which it can simultaneously engage both of the side walls 2a, 2a of the groove.

In operation, and at those times when the roller is in its correct position relative to the groove, the abutment member is free to rotate at random and imposes little or no frictional restraint on rotation of the roller 5 relative to the outer guide member 7. In the event that the roller is subjected to forces which cause it to climb down that one of the groove side walls in which it is in rolling contact by the roller moving radially inwardly of the axis of the outer rotatable member 1, prior to the roller simultaneously engaging both side walls of the groove at the lower edge of the roller, the outer periphery 9b of the abutment member 9 engages the abutment surfaces 10, 10 to prevent further radially inward movement of the roller 5.

At this time, due to the conicity of the abutment member 9 and the sliding contact of the outer periphery thereof with the abutment surfaces 10, 10, which act as camming surfaces, a force is exerted on the abutment member in a direction radially outwardly of the axis of the outer rotatable member 1, that force being transmitted directly to the roller 5 in opposition to the force exerted on the roller 5 in a direction radially inwardly of the outer rotatable member 1, and acting to assist in movement of the roller assembly in a direction radially outwardly along the trunnion 4 for the roller again to assume proper seating engagement with that one of the side walls in which it is in rolling contact.

In the event that the direction of rotation of the universal joint is reversed from the direction illustrated in FIG. 6, the free-floating relationship of the abutment member 9 relative to the outer guide member 7 accommodates the required relative angular movement between the inner and outer rotatable members 1 and 3 which is required to bring the roller 5 into spaced relationship with the previously engaged side wall 2a and into rolling engagement with the opposite side wall 2a.

In order to control the movement of the roller in a direction radially outwardly of the axis of the outer rotatable member 1 and thus prevent simultaneous engagement of the roller with both side walls 2a, 2a of the groove, preferably the outer guide member 7 is dimensioned to engage the bottom wall of the groove 2 prior to the roller reaching a position in which simultaneous engagement wit both side walls of the groove can occur. Alternatively, an additional abutment member 9 (not shown) can be provided at the opposite axial end of the roller, in which event cooperating abutment surfaces 10, 10 would be provided adjacent the bottom wall of the groove in a manner which will be easily understood.

Figure 7:
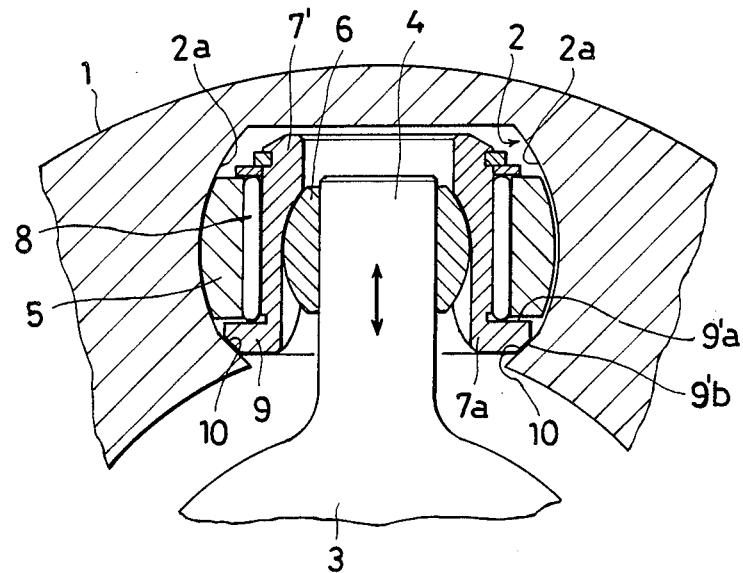

Referring now to FIG. 7, in which the same reference numerals have been used to identify corresponding elements to those illustrated in FIG. 6, the abutment member is formed integrally with outer guide member 7' as a radial flange 9' on an axial extension 7'a of the outer guide member 7'. In FIG. 7, as in FIG. 6, a conical peripheral surface 9'b of the abutment member 9' is dimensioned such that, without regard to the direction of drive of the universal joint, the conical peripheral surface 9'b will engage the abutment surfaces 10, 10 prior to the condition in which the roller 5 can simultaneously contact both of the opposed side walls 2a, 2a of the groove 2.

In FIG. 7, axial play slightly in excess of normal manufacturing tolerances is provided between the roller 5 and the outer guide member 7', in order that any force applied to the outer guide member in a direction radially inwardly of the axis of the outer rotatable member 1 will result in the outer guide member moving radially inwardly to an extent sufficient to produce engagement of the conical surface 9'b with the abutment surfaces 10, 10 prior to a radially inward force being exerted on the roller 5. Upon engagement of the conical surface with the abutment surfaces 10, 10, the inner and outer guide members 6 and 7' are forced axially outwardly along the trunnion 4 in the substantial absence of any radially inward force being exerted on the roller 5 relative to the axis of the outer rotatable member 1.

Figure 8:
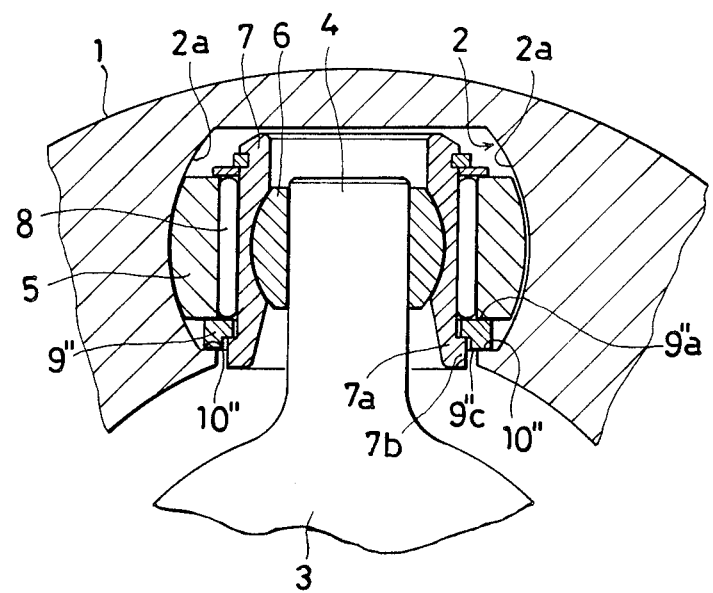

Referring now to FIG. 8, in which corresponding reference numerals have been used to identify corresponding elements with those illustrated in FIG. 6, an annular abutment member 9" is positioned on a radial flange 7b formed on an extension 7a of the outer guide member 7, the abutment member having an upper planar surface 9"a which provides an end seating for the roller 5, and having a lower planar surface 9"c which abuts co-planar abutment surfaces 10", 10" formed at the radially innermost edges of the side walls 2a, 2a of the groove 2.

In a manner somewhat similar to that described with respect to FIG. 6, upon an axial force being exerted on the roller 5 in a direction radially inwardly of the axis of the outer rotatable member 1, the roller 5 forces the abutment member into engagement with the abutment surfaces 10", and the roller 5 is then prevented from further radially inward movement by its engagement with the abutment member 9". The abutment member 9" is supported on the outer guide member 7 in floating relationship therewith, and is of an axial length such that it engages the abutment surfaces 10, 10 and precludes further radially inward movement of the roller 5 prior to the roller 5 reaching a position by climbing down the side wall 2a, in which it would come into contact simultaneously with both of the opposed side walls 2a, 2a of the groove 2.

While preferred embodiments of the invention have been described, it will be appreciated that various modifications may be made in the structures disclosed without departing from the scope of the invention as defined in the appended claims.

What is claimed is:

1. In a constant velocity universal joint of the type including an inner rotatable member, trunnions extending radially of said inner rotatable member, roller assemblies supported on said trunnions for sliding movement axially thereof, each roller assembly including a roller and members supporting said roller for universal pivoting movement relative to the supporing trunnion, an outer rotatable member having internal axially extending grooves, said grooves having opposite concave side walls in which said rollers are received and held captive, said rollers having an outer periphery of complementary shape to that of said concave side walls and being of a diameter slightly less than the maximum width of said grooves such that each said roller is rollable longitudinally on one of said side walls with clearance with the opposite side wall;

the improvement comprising an annular abutment member carried by each roller assembly for travel therewith as said roller assembly travels in its respective groove and on its respective trunnion, each side wall of each groove having an abutment surface extending longitudinally along each side wall, said abutment member having an outer surface facing the abutment surfaces of the side walls to come into engagement with said abutment surfaces upon movement of said roller in a direction radially of the longitudinal axis of said outer rotatable member to limit said movement of the roller in said radial direction and preserve said clearance of the roller in said groove.

2. The constant velocity universal joint according to claim 1, in which said abutment member comprises an annular member and said roller assembly is provided with surfaces supporting said annular member for limited unrestricted movement in a plane perpendicular to the longitudinal axis of the roller.

3. The constant velocity universal joint according to claim 2, in which said annular member has a frusto conical periphery and said abutment surfaces are inclined at an included angle complementary to the included angle of said outer periphery.

4. The constant velocity universal joint according to claim 3, in which said abutment surfaces are located at the edges of said side walls closest to the axis of said outer rotatable member.

5. The constant velocity universal joint according to claim 2 wherein each said roller assembly includes a radial flange and needle rollers between said roller and said members which support said roller, said radial flange supporting said annular member which in turn constitutes an end support for said needle rollers and an end abutment for said roller.

6. The constant velocity universal joint according to claim 5 in which said annular member has first and second planar parallel radial surfaces, the first planar surface providing said end support for said needle rollers and said end abutment for said roller, said abutment surfaces on said side walls extending parallel to said second radial surface of said annular member in facing relation therewith.

7. The constant velocity universal joint according to claim 1, in which said abutment member comprises an annular flange integral with one of said members which support said roller for universal pivoting movement relative to said trunnion.

8. The constant velocity universal joint according to claim 7, in which said annular flange has a frusto conical outer periphery and said abutment surfaces are inclined at an included angle complementary to the included angle of said outer periphery.

9. The constant velocity universal joint according to claim 7, in which said abutment surfaces are located at the edges of said side walls closest to the axis of said outer rotatable member.

10. The constant velocity universal joint according to claim 7 in which said roller assembly includes needle rollers between said roller and said members which support said roller, said annular flange facing said needle rollers and said roller to provide an end support for said needle rollers and an end abutment for said roller.

11. A constant velocity universal joint comprising inner and outer rotatable members having respective longitudinal axes of rotation and being relatively pivotable with respect to one another, trunnions extending radially outwards on said inner member, said outer rotatable member having longitudinal grooves therein, one for each trunnion, each of said grooves having opposite curved side walls, roller means on said trunnions rollably supported in said grooves for axial travel therein, said roller means comprising a roller rotatably mounted on each said trunnion for universal pivotal movement and being slidable axially thereof, said roller having a curved outer surface complimentary to the curved side walls of the respective groove and being rollably engaged therein for axial travel in said groove, said roller being undersized relative to the maximum width of the groove measured between the side walls to provide a clearance in said groove so that with the roller disposed at the maximum width of the groove the outer surface of the roller does not contact both of the respective side walls of the groove simultaneously, and abutment means carried by each of said roller means for travel therewith as said roller means travels in the respective groove and on the respective trunnion said abutment means being positioned for engaging the side walls of the respective said groove to limit axial travel of the roller means on the trunnion and preserve the clearance of the roller in the groove when the roller means slides axially on the trunnion.

12. A constant velocity universal joint as claimed in claim 11 wherein the outer surface of each roller is part-spherical and the opposite walls of each groove are of concave spherical shape conforming to the shape of said part-spherical surface of the roller.

13. A constant velocity universal joint as claimed in claim 12 wherein said abutment means comprises an annular abutment element disposed adjacent said roller inwardly thereof.

14. A constant velocity universal joint as claimed in claim 13 wherein each said roller means includes a needle bearing between the roller and the trunnion, said annular abutment element facing said needle bearing to support the same endwise.

15. A constant velocity universal joint as claimed in claim 13 wherein each said roller means comprises an inner guide member rotatably mounted on the respective trunnion and axially slidable thereof and an outer guide member supporting said roller and mounted for universal pivotable movement on the inner guide member, said annular abutment element being integral with said outer guide member.

16. A constant velocity universal joint as claimed in claim 13 wherein each said roller means comprises an inner guide member rotatably mounted on the respective trunnion and axially slidable thereof and an outer guide member supporting said roller and mounted for universal pivotable movement on the inner guide member, said annular abutment element being mounted on said outer guide member with clearance in free floating relation for rotatable and axial travel with respect thereto.

17. A constant velocity universal joint as claimed in claim 13 wherein said walls of said groove have inner ends which are flat and inclined inwardly and serve as abutment surfaces for said abutment means.

18. A constant velocity universal joint as claimed in claim 17 wherein said annular abutment element has an outer frusto-conical surface.

19. A constant velocity universal joint as claimed in claim 18 wherein said inclined inner ends of said walls and said frusto-conical outer surface of said abutment element subtend equal angles.

20. A constant velocity universal joint as claimed in claim 13 wherein said walls of said grooves have inner ends which are flat and extend perpendicular to the axis of the respective trunnion, said annular abutment element having a radial surface facing the inner ends of the grooves.

21. A constant velocity universal joint as claimed in claim 11 wherein each said roller means is supported on its respective trunnion for travel axially on said trunnion in opposite directions to move radially inwards and outwards with respect to said inner rotatable member, said abutment means being carried by its respective roller means to contact the side walls of the respective groove during travel of said roller means inwardly on said trunnion to limit the inward travel in order to preserve the clearance of the roller in the groove whereas for outward radial travel the abutment means is free from contact with the side walls of the groove.

22. A constant velocity universal joint as claimed in claim 21 wherein said side walls of each groove have respective abutment surfaces disposed at an inwards end of said groove closest to the axis of rotation of said inner member and which are differently shaped than the curved side walls, said abutment means being positioned on said roller means to contact said abutment surfaces when the abutment means limits inward travel of the roller means as the trunnion and to move away from the abutment surfaces during travel of the roller means in the outer radial direction.

23. A method of providing free rotation of the rollers in associated grooves of a constant velocity universal joint having inner and outer rotatable members with respective longitudinal axes of rotation and being relatively pivotable with respect to one another, trunnions extending radially outwards on said inner member, said outer rotatable member being provided with said grooves, one of each trunnion, each groove having opposite curved side walls and a roller on each said trunnion rollably supported in an associated groove for travel therein and supported on said trunnion for rotation, universal pivotal movement and axial travel, said roller having an outer curved surface and being undersized in said groove to provide clearance with said side walls, said roller being axially movable on said trunnion to accommodate relative pivotable movement of said inner and outer members, the axial movement of the roller on the trunnion being radially inwardly and outwardly in said groove and tending to bring the surface of said roller into contact with said side walls of the groove simultaneously, said method comprising halting inward and outward radial travel of said roller in said groove before the outer surface of said roller comes into contact with both side surfaces of said groove simultaneously such that said roller remains with clearance in said groove and is freely rollable in said groove, said halting of at least one of the inward and outward radial travel of the roller being effected by carrying a separate abutment member with the roller for travel therewith in the respective groove and on the respective trunnion and normally being in spaced relation with the side walls of the groove, and contacting the abutment member with the side walls of the groove to halt the at least one of the inward and outward radial travel of the roller.

24. A method as claimed in claim 23 wherein the outer surface of the roller is part-spherical in shape and the groove has opposite walls with concave spherical parts conforming in shape to the part-spherical surface of the roller, the halting of the radial travel of the roller being effected by engaging the abutment member with the side walls of the groove at the radially inner ends thereof.

25. A method as claimed in claim 24 comprising supporting the roller at the inner end thereof by the abutment member.

* * * * *